United States Patent [19]
Mori

[11] Patent Number: 5,886,080
[45] Date of Patent: Mar. 23, 1999

[54] RESIN COMPOSITION

[75] Inventor: Shinji Mori, Koriyama, Japan

[73] Assignee: NOK Corporation, Tokyo, Japan

[21] Appl. No.: 634,932

[22] Filed: Apr. 19, 1996

[30] Foreign Application Priority Data

Apr. 21, 1995 [JP] Japan .................................. 7-120841

[51] Int. Cl.$^6$ .............................. C08J 5/10; C08K 3/40; C08L 33/24
[52] U.S. Cl. ......................... 524/494; 524/492; 524/493; 524/495; 524/496; 524/546; 524/451; 524/406
[58] Field of Search .................................... 524/492, 493, 524/494, 495, 496, 546, 451, 435, 406; 523/212, 213, 214

[56] References Cited

U.S. PATENT DOCUMENTS

| | | | |
|---|---|---|---|
| 4,305,863 | 12/1981 | Adachi et al. | 260/40 TN |
| 4,808,690 | 2/1989 | Slagel | 528/60 |
| 5,352,746 | 10/1994 | Asai et al. | 525/444 |

FOREIGN PATENT DOCUMENTS

| | | |
|---|---|---|
| 2-175793 | 7/1990 | Japan . |
| 5-262976 | 10/1993 | Japan . |
| 7106216A | 8/1993 | Netherlands . |

*Primary Examiner*—James J. Seidleck
*Assistant Examiner*—U. K. Rajguru
*Attorney, Agent, or Firm*—Barnes & Thornburg

[57] ABSTRACT

A resin composition which comprises about 40 to about 95% by weight of a heat-resistant resin having a heat deformation temperature of 100° C. or higher under a stress of 1,820 KPa defined by ASTM D-648 and about 60 to about 5% by weight of spherical glass beads having an average particle diameter of about 10 to about 500 μm, or which comprises about 40 to about 90% by weight of a heat-resistant resin having a heat deformation temperature of 100° C. or higher under a stress of 1, 820 KPa defined by ASTM D-648, about 55 to about 5% by weight of spherical glass beads having an average particle diameter of about 10 to about 500 μm and about 55 to about 5% by weight of a solid lubricant, is used as a suitable molding material for sliding members to be used at contact parts with a soft metal member, and when molded into seal rings in sliding contact with an aluminum alloy rotary shaft of an automatic transmission cylinder, not only wear coefficient of mate material and also self wear coefficient can be considerably lowered, but also a good working oil sealability can be effectively obtained.

9 Claims, No Drawings

RESIN COMPOSITION

BACKGROUND OF THE INVENTION

1. Field of the Invention

The present invention relates to a resin composition, and more particularly to a heat-resistant resin composition used as suitable molding materials for sliding members for use at contact parts with a soft metal member.

2. Related Art

Usually, soft metals (light metals) such as aluminum, aluminum alloy, etc. are used as automobile parts to make automobile bodies lighter. For example, aluminum alloy is used in cylinder rotary shafts of automatic transmissions, and cast iron is used for their sealing, but has such a disadvantage as a poor working oil sealability.

To improve the sealability, seal rings of tetrafluoroethylene resin have been so far used, but have such a disadvantage as wear of mate aluminum alloy materials under the using conditions having high PV value. To prevent wear of mate aluminum alloy materials due to contact with the seal rings of tetra-fluoroethylene resin, seal rings of polyetheretherketone resin filled with carbon fibers and tetrafluoroethylene resin powder was proposed (JA-A-2-175793). As will be shown in Comparative Examples 1 and 4 which follow, it is evident that the wear coefficient of mate aluminum alloy material is quite larger than that in case of cast iron seal rings and such seal rings fails to satisfy the required properties.

SUMMARY OF THE INVENTION

An object of the present invention is to provide a resin composition, which comprises a heat-resistant resin such as polyetheretherketane resin and a filler, the resin composition having less wear of mate soft metal member and less self wear, when molded and used as sliding members for use at contact parts with a soft metal member.

According to a first aspect of the present invention, there is provided a resin composition which comprises about 40 to about 95% by weight of a heat-resistant resin having a heat deformation temperature of 100° C. or higher under a stress of 1,820 KPa defined by ASTM D-648 and about 60 to about 5% by weight of spherical glass beads having an average particle diameter of about 10 to about 500 μm, sum total being 100% by weight.

According to a second aspect of the present invention, there is provided a resin composition which comprises about 40 to about 90% by weight of a heat-resistant resin having a heat deformation temperature of 100° C. or higher under a stress of 1,820 KPa defined by ASTM D-648, about 55 to about 5% by weight of spherical glass beads having an average particle diameter of about 10 to about 500 μm and about 55 to 5% by weight of a solid lubricant, sum total being 100% by weight.

DETAILED EXPLANATION OF THE INVENTION

Heat-resistant resin having a heat deformation temperature of 100° C. or higher under a stress of 1,820 KPa defined by ASTM D-648 for use in the present invention includes, for example, polyetheretherketone resin, polyetherimide resin, polyethersulfone resin, aromatic polyamide resin, polyphenylenesulfide resin, etc., and polyetheretherketone resin is preferably used in the present invention.

Polyetheretherketone resin is obtained by desalting-polycondensation reaction of 4,4'-difluorobenzophenone and hydroquinone-dipotassium salt and is commercially available from ICI, Sumitomo Kagaku K. K. (Victorex PEEK 150G), etc. In the present invention, these commercially available products can be used as such.

Spherical glass beads for use in the present invention have an average diameter of about 10 to about 500 μm, preferably about 20 to about 100 μm. Below about 10 μm, wear reduction of soft metal will be less effective, whereas, above about 500 μm, not only moldability will be deteriorated, but also mechanical strength will be considerably lowered. Usually, spherical glass beads having an average diameter within the above-mentioned range is used upon treatment with a silane coupling agent such as aminosilane, epoxysilane, etc.

The heat-resistant resin and the spherical glass beads are used in such a proportion as about 40 to about 95% by weight, preferably about 60 to about 90% by weight, of the former and about 60 to about 5% by weight, preferably about 40 to about 10% by weight, of the latter, the sum total being 100% by weight. Below about 5% by weight of the spherical glass beads, the wear reduction of soft metal such as aluminum alloy, etc. will be less effective, whereas above about 60% by weight thereof the moldability will be deteriorated.

It is possible to use a solid lubricant such as tetrafluoroethylene resin powder, carbon fibers, carbon powder, whisker fibers, molybdenum disulfide powder, talc powder, etc. together with the spherical glass beads. In that case, about 40 to about 90% by weight, preferably about 60 to about 90% by weight, of the heat-resistant resin, about 55 to about 5% by weight, preferably about 30 to about 10% by weight, of the spherical glass beads, and about 55 to about 5% by weight, preferably about 30 to about 5% by weight, of the solid lubricant, sum total being 100% by weight, can be used.

The present resin composition can be prepared by uniformly mixing the above-mentioned two or three components in a mixer such as a Henschel mixer, etc., then further melt mixing the mixture through an extruder at a temperature higher than the melting point of the resin (Tg: 365° C.) and pelletizing the melt mixture through a pelletizer. The thus obtained resin composition can be molded by a various molding procedures such as injection molding, extrusion molding, extrusion coating, electrostatic painting, rotary molding, melt spinning, etc.

The present resin composition can be used as a suitable molding material for sliding members to be used at contact parts with a soft metal member, and when molding into seal rings in sliding contact with, for example, an aluminum alloy rotary shaft of an automatic transmission cylinder, not only wear coefficient of mate material and also self wear coefficient can be considerably lowered, but also a good working oil sealability can be effectively obtained.

PREFERRED EMBODIMENTS OF THE INVENTION

The present invention will be described in detail below, referring to Examples and Comparative Examples.

EXAMPLE 1

The following components were uniformly mixed in a Henschel mixer in the following mixing proportions, and the resulting mixture was further melt mixed at 400° C. through an extruder, and pelletized through a pelletizer. Then, the pellets were injection molded into a seal ring (outer diameter: 52 mm; inner diameter: 48 mm) at an injection pressure of 100 MPa and a cylinder temperature of 410° C.:

| | |
|---|---|
| Polyetheretherketone resin (Victorex PEEK 150G, trademark of a product made by Sumitomo Kagaku K. K., Japan; heat tranformation temperature: 152° C.) | 85 wt. % |
| Spherical glass beads treated with aminosilane (UB-47L, trademark of a product made by Union Glass K. K., Japan; average diameter: 75 μm) | 15 wt. % |

EXAMPLES 2 to 5

Seal rings were injection molded in the same manner as in Example 1 except that in place of the polyetheretherketone resin the following other heat-resistant resins were used in the same proportion as in Example 1:

| Ex. No. | Heat-resistant resin | Heat transformation temperature (°C.) |
|---|---|---|
| 2 | Polyetherimide resin (Ultem 1000, trademark of a product made by Japan GE Plastics K. K., Japan) | 200 |
| 3 | Polyethersulfone resin (Sumikaexcel PES3600G, trademark of a product made by Sumitomo Kagaku K. K., Japan) | 203 |
| 4 | Aromatic polyamide resin (Aren A3010, trademark of a product made by Mitsui Petrochemical K. K., Japan) | 130 |
| 5 | Polyphenylenesulfide resin (LN-2P, trademark of a product made by Tohprene K. K., Japan) | 108 |

EXAMPLE 6

A seal ring was injection molded in the same manner as in Example 1 except that the proportion of the polyetheretherketone resin was changed to 70% by weight of and the proportion of the aminosilane-treated spherical glass beads was changed to 30% by weight.

EXAMPLES 7 to 9

Seal rings were extrusion molded in the same manner as in Example 1 except that a portion (i.e. 10% by weight) of the polyetheretherketone resin was replaced with the following solid lubricants.

| Ex. No. | Solid lubricant |
|---|---|
| 7 | Carbon powder (AT-3CM, trademark of a product made by Oriental Sangyo K. K., Japan; average particle size: 12 μm) |
| 8 | Potassium titanate whisker (Tofica YD-101, trademark of a product made by Ohtsuka Kagaku K. K., Japan; average fiber length: 10 to 20 μm) |
| 9 | Tetrafluoroethylene resin powder (KTL-500F, trademark of a product made by Kitamura K. K., Japan; average particle size: 15 μm) |

Comparative Example 1

A seal ring was injection molded in the same manner as in Example 1 from a resin composition consisting of the following components:

| | |
|---|---|
| Polyetheretherketone resin (150G) | 70 wt. % |
| Carbon fibers (M201S, trademark of a product made by Kureha Kagaku K. K., Japan) | 20 wt. % |
| Tetrafluoroethylene resin powder (KTL-500F) | 10 wt. % |

Comparative Example 2

A seal ring was injection molded in the same manner as in Example 1 from a resin composition consisting of the following components:

| | |
|---|---|
| Polyetheretherketone resin (150G) | 85 wt. % |
| Carbon powder (AT-3CM) | 15 wt. % |

Comparative Example 3

A seal ring was injection molded in the same manner as in Example 1 from a resin composition consisting of the following components:

| | |
|---|---|
| Polyetheretherketone resin (150G) | 85 wt. % |
| Tetrafluoroethylene resin powder (KTL-500F) | 15 wt. % |

Comparative Example 4

Cast iron seal ring used in the ordinary automatic transmission was employed.

Comparative Example 5

Tetrafluoroethylene resin seal ring having a heat deformation temperature of 55° C. used in the ordinary automatic transmission was employed.

The seal rings obtained in the foregoing Examples 1 to 9 and Comparative Example 1 to 5 were subjected to a wear test under the following conditions to determine wear coefficient K of mate material (aluminum alloy ADC-12) and self wear coefficient K [both in unit of $\times 10^{-5}$ cm. sec/(MPa. m. hr)]. Test time was 50 hours for Examples 1 to 9 and Comparative Example 4 and 5 hours for other Comparative Examples.

Oil hydraulic pressure: 1 MPa

Peripherial speed: 19 m/sec

Oil species: Apolloil Best ATF
 (Product made by Idemitsu Kosan K. K., Japan)

The result are shown in the following Table.

| | Wear coefficient K | |
|---|---|---|
| | Mate material | Self |
| Example 1 | 0.01 | 0.03 |
| Example 2 | 0.04 | 0.2 |
| Example 3 | 0.04 | 0.2 |
| Example 4 | 0.03 | 0.2 |
| Example 5 | 0.01 | 0.04 |
| Example 6 | 0.01 | 0.03 |
| Example 7 | 0.01 | 0.02 |
| Example 8 | 0.01 | 0.02 |
| Example 9 | 0.02 | 0.02 |
| Comp. Ex. 1 | 0.2 | 0.5 |
| Comp. Ex. 2 | 0.4 | 1.3 |

-continued

| | Wear coefficient K | |
|---|---|---|
| | Mate material | Self |
| Comp. Ex. 3 | 0.3 | 1.2 |
| Comp. Ex. 4 | 0.01 | 0.01 |
| Comp. Ex. 5 | 2.0 | 0.2 |

Seal rings Example 1 and Comparative Examples 4 to 5 were provided in grooves of aluminum alloy shafts fixed to the carbon steel S45C housing in a rotary tester, respectively, and carbon steel S45C cylinders in external contact with the seal rings were rotated at a specif RPM by a motor. The amount of oil leaked into the drain boat provided under the housing was measured by a measuring cylinder. The following results were obtained.

| | Oil leakage (cc/min.) |
|---|---|
| Example 1 | 10 |
| Com. Ex. 4 | 240 |
| Com. Ex. 5 | 1.5 |

The above-mentioned wear coefficient K was determined by calculating amounts of wear measured at the side surfaces of the shafts and seal rings in the rotary test into mate material wear coefficient and self coefficient, respectively.

What is claimed is:

1. A resin composition which comprises about 40 to about 85% by weight of a heat-resistant resin having a heat deformation temperature of 100° C. or higher under a stress of 1,820 KPa defined by ASTM D-648 and about 60 to about 5% by weight of spherical glass beads having an average particle diameter of about 10 to about 50 $\mu$m, sum total being 100% by weight, wherein the heat-resistant resin is selected from the group consisting of polyetheretherketone resin, polyetherimide resin, polyethersulfide resin, aromatic polyamide resin and polyphenylenesulfide resin.

2. A resin resin composition according to claim 1, wherein the spherical glass beads are those treated with a silane coupling agent.

3. A resin composition according to claim 1, wherein the resin composition is used as a molding material for sliding members to be used at contact parts with a soft metal.

4. A resin composition according to claim 3, wherein the resin composition is used as a molding material for seel rings in contact with an aluminum alloy rotary shaft of automatic transmission.

5. A resin composition which comprises about 40 to about 90% by weight of a heat-resistant resin having a heat deformation temperature of 100° C. or higher under a stress of 1,820 KPa defined by ASTM D-648, about 55 to about 5% by weight of spherical glass beads having an average particle diameter of about 10 to about 500 $\mu$m and about 55 to about 5% by weight of a solid lubricant, sum total being 100% by weight, wherein the heat-resistant resin is selected from the group consisting of polyetheretherketone resin, polyetherimide resin, polyethersulfone resin, aromatic polyamide resin, and polyphenylenesulfide resin.

6. A resin resin composition according to claim 5, wherein the spherical glass beads are those treated with a silane coupling agent.

7. A resin composition according to claim 5, wherein the solid lubricant is tetrafluoroethylene resin powder, carbon fibers, carbon powder, whisker fibers, molybdenum disulfide powder or talc powder.

8. A resin composition according to claim 5, wherein the resin composition is used as a molding material for sliding members to be used at contact parts with a soft metal.

9. A resin composition according to claim 8, wherein the resin composition is used as a molding material for seal rings in contact with an aluminum allow rotary shaft of automatic transmission.

* * * * *